US009890656B2

(12) United States Patent
Craven

(10) Patent No.: US 9,890,656 B2
(45) Date of Patent: Feb. 13, 2018

(54) VARIABLE STATOR VANE ARRANGEMENT

(71) Applicant: ROLLS-ROYCE DEUTSCHLAND LTD & CO KG, Dahlewitz (DE)

(72) Inventor: John Craven, Bristol (GB)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 328 days.

(21) Appl. No.: 14/709,920

(22) Filed: May 12, 2015

(65) Prior Publication Data
US 2015/0345323 A1 Dec. 3, 2015

(30) Foreign Application Priority Data

May 28, 2014 (GB) .................................. 1409449.4

(51) Int. Cl.
F01D 17/16 (2006.01)
F04D 29/56 (2006.01)
(Continued)

(52) U.S. Cl.
CPC ......... F01D 17/162 (2013.01); F04D 29/563 (2013.01); F16C 3/12 (2013.01);
(Continued)

(58) Field of Classification Search
CPC ...... F01D 17/162; F01D 17/16; F04D 29/563; F16C 3/12; F16C 3/22; F16C 3/06; F16C 3/28
See application file for complete search history.

(56) References Cited

U.S. PATENT DOCUMENTS 4,558,986 A 12/1985 Faltys
6,174,130 B1 1/2001 King et al.
(Continued)

FOREIGN PATENT DOCUMENTS

DE 10311227 A1 9/2004
DE 102006048514 B3 5/2007
(Continued)

OTHER PUBLICATIONS

Oct. 6, 2015 Search Report issued in European Patent Application No. 15 16 7301.
(Continued)

Primary Examiner — Logan Kraft
Assistant Examiner — Sabbir Hasan
(74) Attorney, Agent, or Firm — Oliff PLC

(57) ABSTRACT

A variable stator vane arrangement includes a casing, a plurality of stator vanes, at least one control ring, a plurality of connecting rods and a crankshaft. The stator vanes are circumferentially spaced apart in the casing and the plurality of stator vanes are rotatably mounted in the casing. Each control ring is rotatably mounted on the casing and each stator vane is connected to an associated control ring. The crankshaft, rotatably mounted on the casing, is drivingly connected to each control ring and has an axis and a plurality of clevizes. Each connecting rod connects one of the clevizes on the crankshaft to a respective one of the control rings. At least one clevis is adjustably secured to the crankshaft by an adjusting mechanism and the adjusting mechanism is used to select the radial and/or angular position of at least one clevis relative to the axis of the crankshaft.

20 Claims, 6 Drawing Sheets

(51) Int. Cl.
  *F16C 3/12* (2006.01)
  *F16C 3/22* (2006.01)
(52) U.S. Cl.
  CPC ............ *F16C 3/22* (2013.01); *F05D 2220/32* (2013.01); *F05D 2230/644* (2013.01); *F05D 2260/50* (2013.01); *F16C 2360/23* (2013.01)

(56) References Cited

U.S. PATENT DOCUMENTS

| | | | |
|---|---|---|---|
| 6,457,937 | B1 | 10/2002 | Mashey |
| 6,551,057 | B1 * | 4/2003 | Haaser ................. F01D 17/162 415/119 |
| 2004/0022624 | A1 | 2/2004 | Harrold |
| 2004/0202538 | A1 | 10/2004 | Hausknecht |
| 2012/0093652 | A1 | 4/2012 | Belmonte et al. |
| 2013/0266424 | A1 | 10/2013 | Soehner |

FOREIGN PATENT DOCUMENTS

| | | |
|---|---|---|
| EP | 1065392 A2 | 1/2001 |
| EP | 1101902 A2 | 5/2001 |
| EP | 2343238 A2 | 7/2011 |
| EP | 2586701 A2 | 5/2013 |
| EP | 2650490 A2 | 10/2013 |
| EP | 2703606 A1 | 3/2014 |
| FR | 2952979 A1 | 5/2011 |
| WO | 2010/130893 A1 | 11/2010 |
| WO | 2014/081577 A1 | 5/2014 |

OTHER PUBLICATIONS

Nov. 27, 2014 Search Report issued in British Patent Application No. 1409449.4.

Nov. 20, 2015 Search Report issued in European Patent Application No. 15 16 8092.

* cited by examiner

VARIABLE STATOR VANE ARRANGEMENT

FIELD OF THE DISCLOSURE

The present disclosure relates to a variable stator vane arrangement and in particular to a variable stator vane arrangement for a compressor, or a variable stator vane arrangement for a turbine, especially for a gas turbine engine or a turbomachine.

BACKGROUND TO THE DISCLOSURE

A variable stator vane arrangement is used to set the variable stator vanes in a compressor, or a turbine, into their desired angular position.

One known type of variable stator vane arrangement uses a crankshaft to drive a number of stages of variable stator vanes. Each stage of variable stator vanes comprises a plurality of stator vanes connected to an associated control ring by respective operating levers. The crankshaft is connected to each control ring, or unison ring, by a connecting rod. Each connecting rod is mounted onto the crankshaft by a clevis. Each clevis is provided on an associated crank arm on the crankshaft. The crankshaft is rotated around its rotational axis by a force applied by a variable stator vane actuator. The radial and angular position of the clevis on the crankshaft determines the operating schedule for that particular stage of variable stator vanes.

Conventionally all of the clevises on the crankshaft are provided in a fixed position on the crankshaft and thus the operating schedule for all the stages of variable stator vanes is fixed, e.g. each crank arm is provided at a fixed circumferential position on the crankshaft and has a fixed length. The use of fixed operating schedules for all of the stages of variable stator vanes is acceptable, and conventional, on production gas turbine engines and other turbomachines.

However, during the development programme of a gas turbine engine, or a turbomachine, it may be necessary to adjust the radial and angular positions of the clevises on the crankshaft for one or more of the stages of variable stator vanes in order to determine, or to provide, an optimum operating schedule for each of the stages of variable stator vanes. This may necessitate the manufacture of different crankshafts with clevises at different radial and angular positions and this may delay the gas turbine engine development program, increases the cost of the development programme and may compromise the results of the development programme.

Therefore the present disclosure seeks to provide a novel variable stator vane arrangement which reduces or overcomes the above mentioned problem.

STATEMENTS OF DISCLOSURE

Accordingly the present disclosure provides a variable stator vane arrangement comprising a casing, a plurality of stages of variable stator vanes, a plurality of connecting rods and a crankshaft, each stage of variable stator vanes comprises a plurality of stator vanes, a control ring and a plurality of operating levers, each operating lever connects the control ring to a respective one of the stator vanes, the stator vanes in each stage of variable stator vanes are circumferentially spaced apart in the casing, the stator vanes in each stage of variable stator vanes are rotatably mounted in the casing, the crankshaft is rotatably mounted on the casing, the crankshaft has an axis and a plurality of clevises, each connecting rod connects one of the clevises on the crankshaft to a respective one of the control rings, wherein at least one clevis is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position.

The at least one clevis may be radially slidably mounted on the crankshaft. The at least one clevis may be rotatably mounted on the crankshaft. The at least one clevis may be eccentrically rotatably mounted on the crankshaft.

The adjusting mechanism may comprise at least one wedge. The adjusting mechanism may comprise two wedges and the wedges are movable in a plane which is perpendicular to the axis of the crankshaft and in a direction perpendicular to a radial direction.

The clevis may be secured to the crankshaft by a fastener, the fastener extends through an aperture in the crankshaft, the aperture is arranged radially with respect to the axis of the crankshaft, the clevis has two angled wedging surfaces and both of the wedges has a wedging surface arranged to abut a corresponding wedging surface on the clevis.

Each wedge may be arranged on at least one threaded stud extending from the crankshaft. Each wedge may be arranged on two threaded studs extending from the crankshaft.

Each wedge may have at least one threaded stud and the at least one threaded stud of each wedge extends through a corresponding aperture in the crankshaft.

The wedging surfaces of the clevis may be arranged to intersect radially outwardly of a radially inner surface of the clevis and the wedging surfaces of the wedges are arranged parallel to the wedging surfaces of the clevis.

The wedging surfaces of the clevis may be arranged to intersect radially inwardly of a radially inner surface of the clevis and the wedging surfaces of the wedges are arranged parallel to the wedging surfaces of the clevis.

The aperture may be a slot extending transversely of the crankshaft.

The fastener may comprise a bolt and the clevis has a threaded aperture to receive the bolt. The fastener may comprise a screw and the clevis has a threaded aperture to receive the screw.

The adjusting mechanism may comprise a plurality of circumferentially spaced apertures in an end of the crankshaft, a locating pin is arranged in a selected one of the apertures in the end of the crankshaft, a driving plate is rotatably mounted on the crankshaft about the axis of the crankshaft, the driving plate has a plurality of circumferentially spaced apertures in at least one surface of the plate, the locating pin is arranged in a selected one of the apertures in the driving plate, a crank arm has first and second radially aligned slots and the clevis, the crank arm is secured to the end of the crankshaft by a first fastener positioned in the first slot and the crank arm is secured to the driving plate by a second fastener positioned in the second slot.

The adjusting mechanism may comprise a plurality of circumferentially spaced apertures in an end of the crankshaft, a locating pin is arranged in a selected one of the apertures in the end of the crankshaft, a ring has an eccentric aperture, the ring is rotatably mounted on the end of the crankshaft, the ring is located in a recess in the clevis, the base of the recess has a plurality of circumferentially spaced slots, the slots extend radially, the locating pin is arranged in a selected one of the slots in the base of the recess, the clevis is secured to the end of the crankshaft by a fastener.

A plurality of the clevises may be adjustably mounted on the crankshaft. All of the clevises may be adjustably mounted on the crankshaft.

An actuator may be arranged to rotate the crankshaft. The actuator may comprise a hydraulic actuator, a pneumatic actuator or an electric actuator.

The variable stator vane arrangement may be a compressor variable stator arrangement or a turbine variable stator vane arrangement.

The variable stator vane arrangement may be a variable stator vane arrangement for a gas turbine engine or a variable stator vane arrangement for a turbomachine.

The gas turbine engine may be an aero gas turbine engine, a marine gas turbine engine, an automotive gas turbine engine or an industrial gas turbine engine.

The gas turbine engine may be a turbofan gas turbine engine, a turbo-shaft gas turbine engine, a turbo-propeller gas turbine engine or a turbojet gas turbine engine.

The present disclosure also provides a variable stator vane arrangement crankshaft, the crankshaft having an axis and a plurality of clevises, wherein at least one clevis is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position.

The at least one clevis may be radially slidably mounted on the crankshaft. The at least one clevis may be rotatably mounted on the crankshaft. The at least one clevis may be eccentrically rotatably mounted on the crankshaft.

The adjusting mechanism may comprise a plurality of circumferentially spaced apertures in an end of the crankshaft, a locating pin is arranged in a selected one of the apertures in the end of the crankshaft, a driving plate is rotatably mounted on the crankshaft about the axis of the crankshaft, the driving plate has a plurality of circumferentially spaced apertures in at least one surface of the plate, the locating pin is arranged in a selected one of the apertures in the driving plate, a crank arm has first and second radially aligned slots and the clevis, the crank arm is secured to the end of the crankshaft by a first fastener positioned in the first slot and the crank arm is secured to the driving plate by a second fastener positioned in the second slot.

The adjusting mechanism may comprise a plurality of circumferentially spaced apertures in an end of the crankshaft, a locating pin is arranged in a selected one of the apertures in the end of the crankshaft, a ring has an eccentric aperture, the ring is rotatably mounted on the end of the crankshaft, the ring is located in a recess in the clevis, the base of the recess has a plurality of circumferentially spaced slots, the slots extend radially, the locating pin is arranged in a selected one of the slots in the base of the recess, the clevis is secured to the end of the crankshaft by a fastener.

The adjusting mechanism may comprise two wedges and the wedges are movable in a plane which is perpendicular to the axis of the crankshaft and in a direction perpendicular to a radial direction.

The clevis may be secured to the crankshaft by a fastener, the fastener extends through an aperture in the crankshaft, the aperture is arranged radially with respect to the axis of the crankshaft, the clevis has two angled wedging surfaces and both of the wedges has a wedging surface arranged to abut a corresponding wedging surface on the clevis.

Each wedge may be arranged on at least one threaded stud extending from the crankshaft. Each wedge may be arranged on two threaded studs extending from the crankshaft.

Each wedge may have at least one threaded stud and the at least one threaded stud of each wedge extends through a corresponding aperture in the crankshaft.

The wedging surfaces of the clevis may be arranged to intersect radially outwardly of a radially inner surface of the clevis and the wedging surfaces of the wedges are arranged parallel to the wedging surfaces of the clevis.

The wedging surfaces of the clevis may be arranged to intersect radially inwardly of a radially inner surface of the clevis and the wedging surfaces of the wedges are arranged parallel to the wedging surfaces of the clevis.

The aperture may be a slot extending transversely of the crankshaft.

The fastener may comprise a bolt and the clevis has a threaded aperture to receive the bolt. The fastener may comprise a screw and the clevis has a threaded aperture to receive the screw.

The present disclosure also provides a method of operating a variable stator vane arrangement, the variable stator vane arrangement comprising a casing, a plurality of stages of variable stator vanes, a plurality of connecting rods and a crankshaft, each stage of variable stator vanes comprises a plurality of stator vanes, a control ring and a plurality of operating levers, each operating lever connects the control ring to a respective one of the stator vanes, the stator vanes in each stage of variable stator vanes are circumferentially spaced apart in the casing, the stator vanes in each stage of variable stator vanes are rotatably mounted in the casing, the crankshaft is rotatably mounted on the casing, the crankshaft has an axis and a plurality of clevises, each connecting rod connects one of the clevises on the crankshaft to a respective one of the control rings, wherein at least one clevis is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position, the method comprising positioning the at least one clevis at a first radial position and a first angular position for a first variable stator vane arrangement schedule and positioning the at least one clevis at a second radial position and/or a second angular position for a second variable stator vane arrangement schedule.

A plurality of the clevises may be adjustably mounted on the crankshaft, the method further comprising positioning each of the clevises at a corresponding first radial position and a corresponding first angular position for the first variable stator vane arrangement schedule and positioning one or more of the clevises at a corresponding second radial position and/or a second angular position for the second variable stator vane arrangement schedule.

BRIEF DESCRIPTION OF THE DRAWINGS

The present disclosure will be more fully described by way of example with reference to the accompanying drawings, in which:—

DETAILED DESCRIPTION

Figure 1:
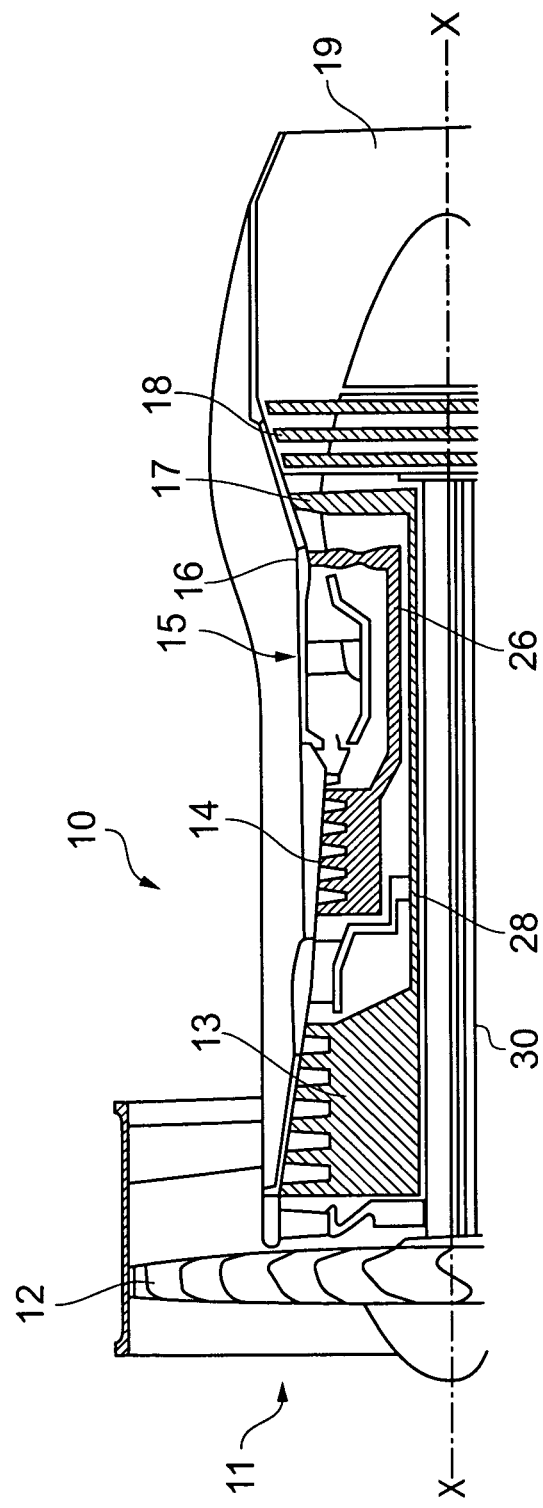
FIG. 1 is partially cut away view of a turbofan gas turbine engine having a variable stator vane arrangement according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
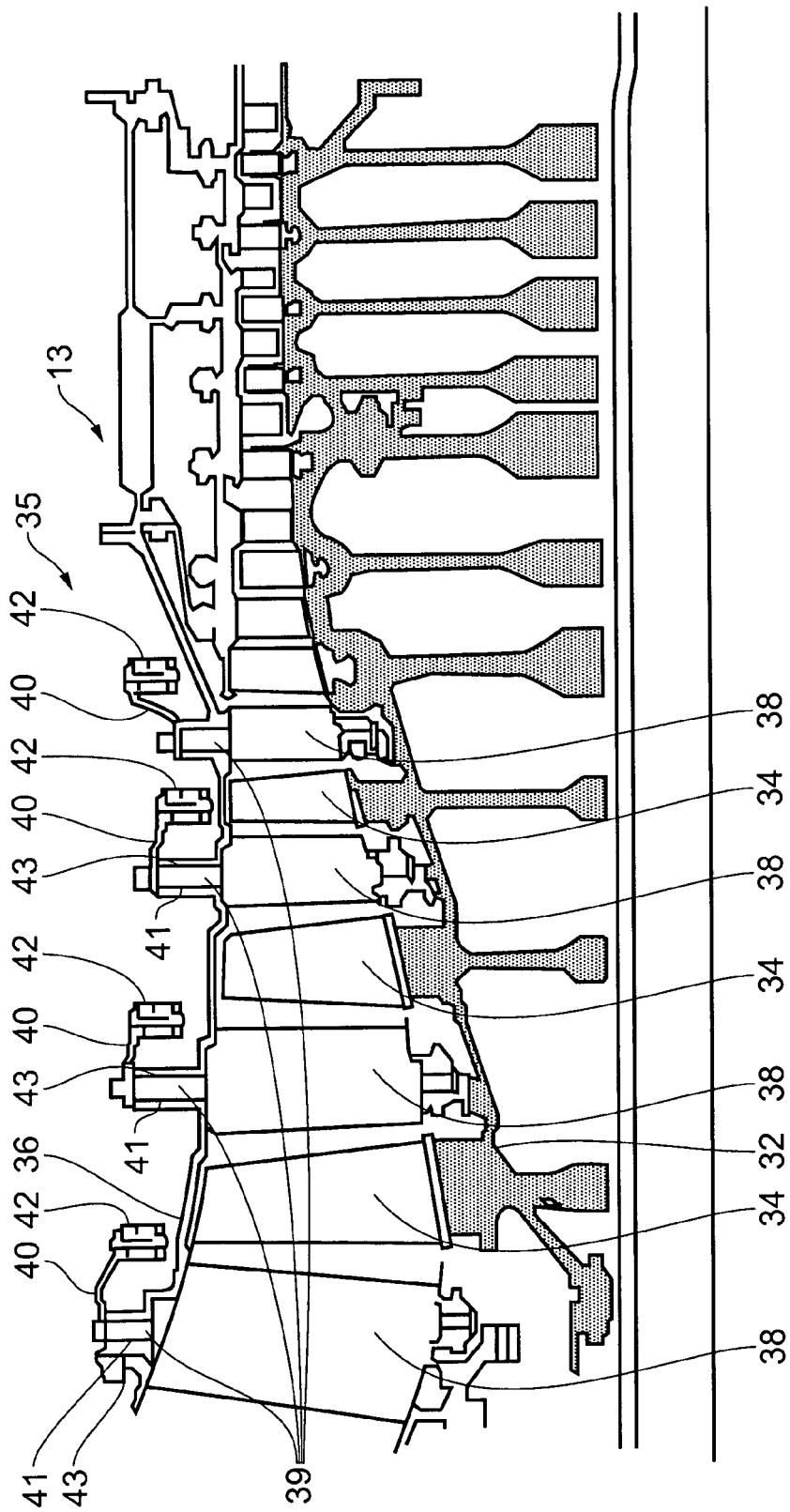
FIG. 2 is an enlarged longitudinal cross-sectional view though a compressor of the turbofan gas turbine engine shown in FIG. 1 showing part of the variable stator vane arrangement according to the present disclosure.
Figure 3:
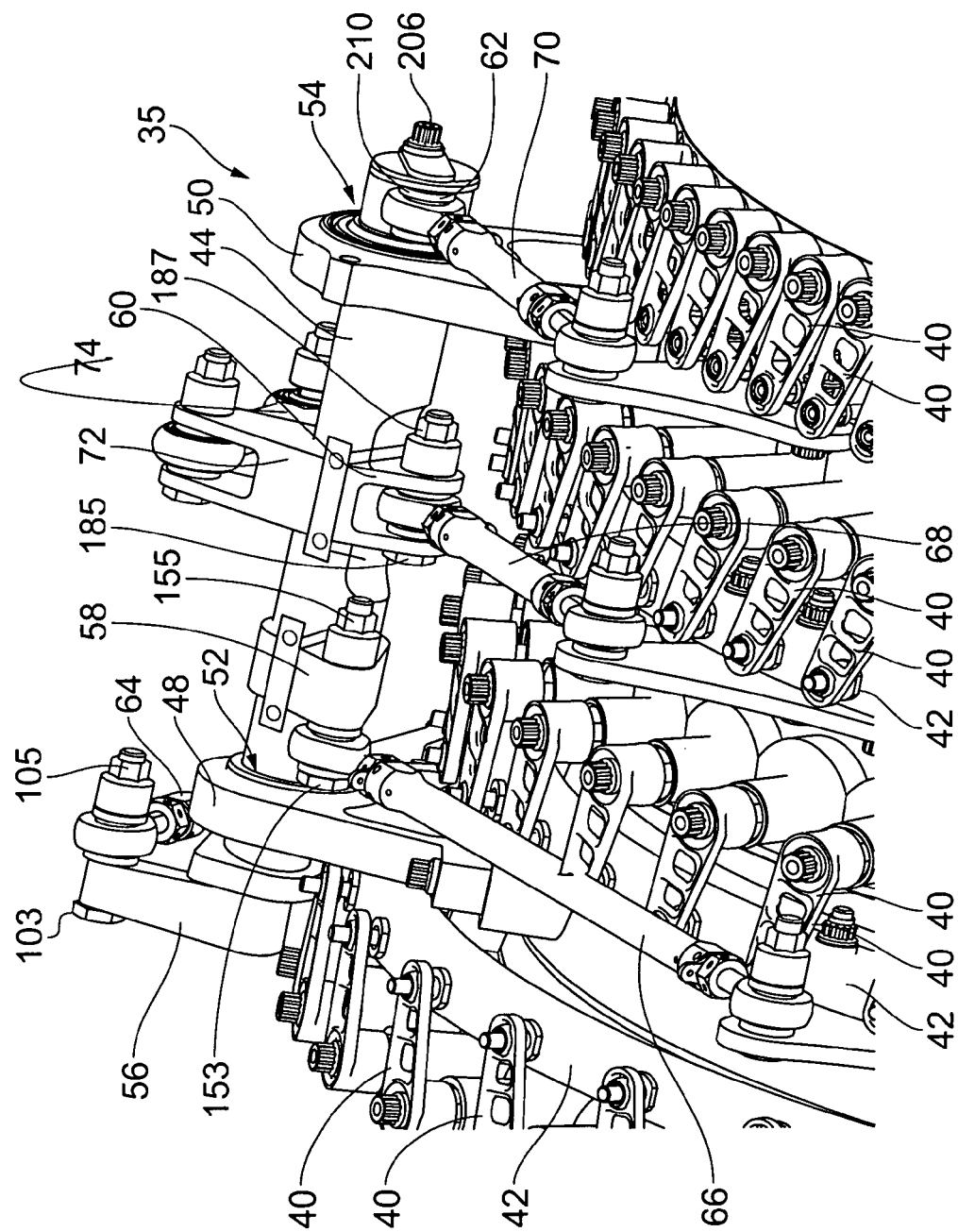
FIG. 3 is a perspective view of a variable stator vane arrangement according to the present disclosure.

The intermediate pressure compressor 13 and a variable stator vane arrangement 35 are shown more clearly in FIGS. 2 to 6. The intermediate pressure compressor 13 comprises a rotor 32 which carries a number of axially spaced stages of rotor blades 34, as shown in FIG. 2. The rotor blades 34 in each stage of rotor blades are circumferentially spaced and extend radially outwardly from the rotor 32. The intermediate pressure compressor 13 also comprises a stator casing 36 which surrounds the rotor 32 and the rotor blades 34. The variable stator vane arrangement 35 comprises the stator casing 36 and a number of axially spaced stages of variable stator vanes 38, as shown in FIG. 2. The stator vanes 38 in each stage of variable stator vanes are circumferentially spaced apart in the stator casing 36 and the stator vanes 38 extend radially inwardly from the stator casing 36. Each stage of variable stator vanes 38 is positioned axially upstream of a respective one of the stages of rotor blades 34. The stator vanes 38 are rotatably mounted in the stator casing 32 and each stator vane 38 has a lever 40 to connect the stator vane 38 to an associated control ring 42. Each stator vane 38 has a spindle 39 at its radially outer end which locates in an aperture 41 in a boss 43 on the stator casing 36. Each lever 40 is mounted on the spindle 39 of a respective one of the stator vanes 38. Each control ring 42 is rotatably mounted on the stator casing 36 substantially coaxially with the rotational axis X-X of the gas turbine engine 10, as shown in FIG. 3.

The variable stator vane arrangement 35 also comprises a crankshaft 44 and a variable stator vane actuator (not shown). The crankshaft 44 is rotatably mounted on the stator casing 32 and in particular the crankshaft 44 is arranged such that its rotational axis is parallel to the rotational axis X-X of the gas turbine engine 10 and the rotational axes of the control rings 42. The crankshaft 44 is rotatably mounted in two bearings 52 and 54 on two axially spaced mounting brackets 48 and 50 respectively which are rigidly secured to the stator casing 32, as shown more clearly in FIG. 3. The mounting brackets 48 and 50 are located on the stator casing 32 at relatively strong/stiff regions of the stator casing 32 for example to a flange or near the bosses 43 on the stator casing 32. The brackets 48 and 50 are secured to the casing by fasteners, e.g. bolts, one of which is shown for bracket 48 in FIG. 3. The crankshaft 44 is drivingly connected to each of the control rings 42 and the crankshaft 44 has a plurality of crank arms 56, 58, 60 and 62 axially spaced apart on the crankshaft 44. Each control ring 42 is connected to a respective crank arm 56, 58, 60 and 62 on the crankshaft 44 by an associated connecting rod 64, 66, 68 and 70 respectively as shown in FIG. 3. The actuator is drivingly connected to the crankshaft 44 by a connecting rod 74 which is connected to a further crank arm 72 on the crankshaft 44. The crankshaft 44 has a plurality of clevises 76, 78, 80 and 82 and each clevis is provided on a respective one of the crank arms 56, 58, 60 and 62 respectively. Each connecting rod 64, 66, 68 and 70 connects one of the clevises 76, 78, 80 and 82 on the crankshaft 44 to a respective one of the control rings 42.

The variable stator vane arrangement 35 is arranged such that at least one of the clevises 76, 78, 80 and 82 is adjustably secured to the crankshaft 44 by an adjusting mechanism, the adjusting mechanism is used to select the radial position and the angular position of the at least one clevis 76, 78, 80 and 82 relative to the axis of rotation of the crankshaft 44. In this particular variable stator vane arrangement 35, as shown in FIGS. 3 to 6, each of the clevises 76, 78, 80 and 82 is adjustably secured to the crankshaft 44 by an associated adjusting mechanism and each adjusting mechanism is used to select the radial position and the angular position of the respective one of the clevises 76, 78, 80 and 82 relative to the axis of rotation of the crankshaft 44.

Figure 4:
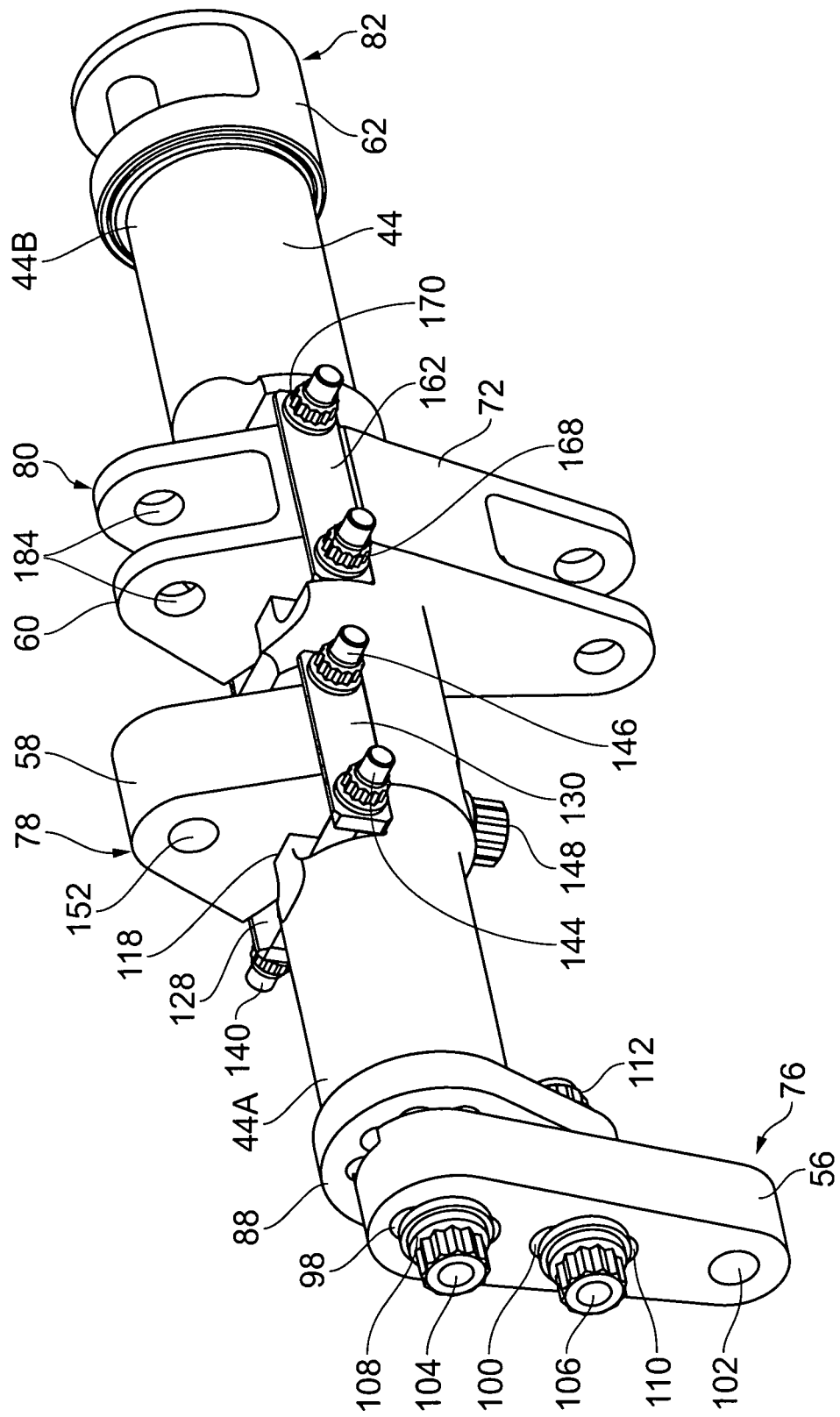
FIG. 4 is an enlarged perspective view showing a crankshaft of the variable stator vane arrangement according to the present disclosure.
Figure 5:
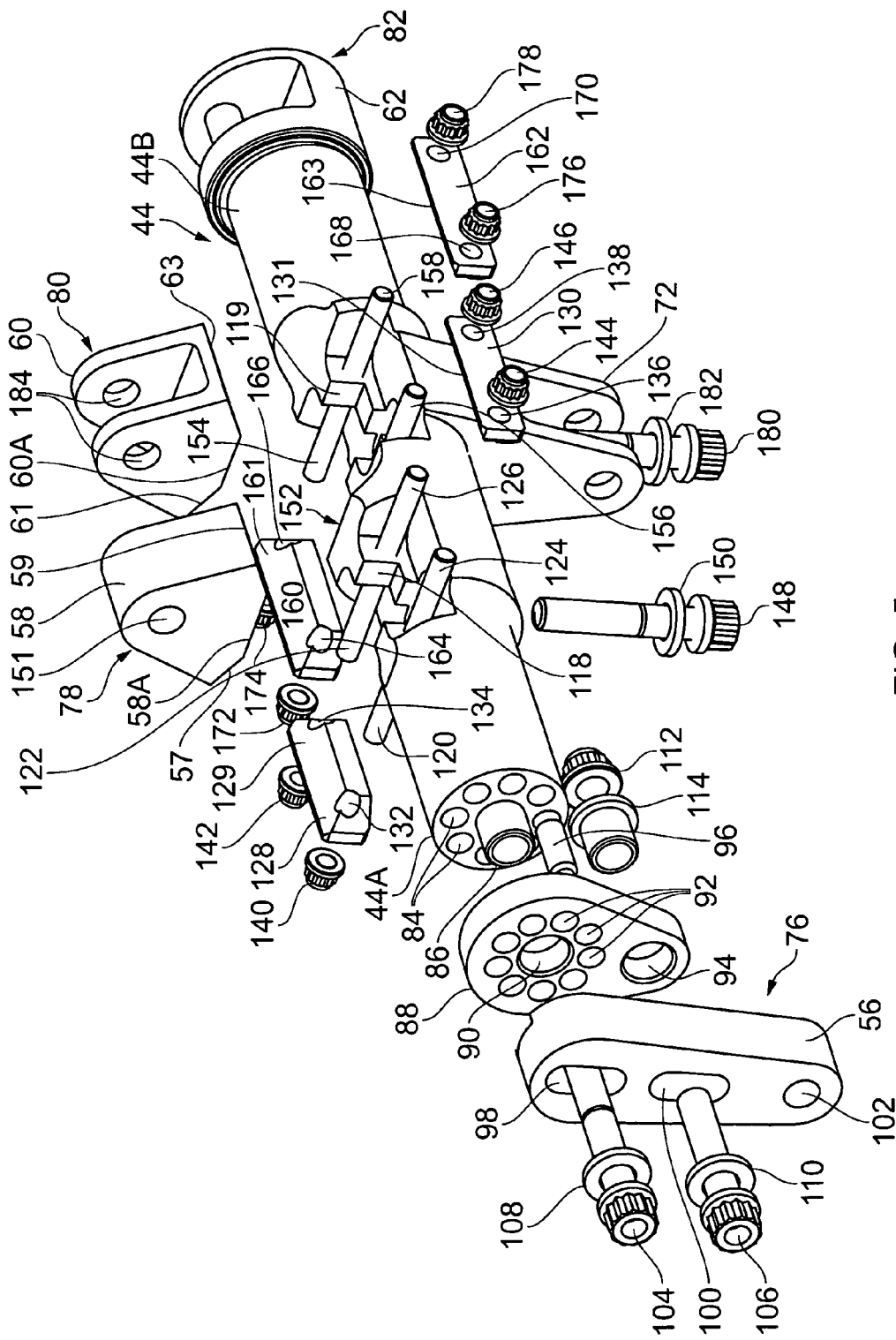
FIG. 5 is an exploded perspective view of the crankshaft of the variable stator vane arrangement shown in FIG. 4.

The first clevis 76 is provided at a first axial end 44A of the crankshaft 44 and the crank arm 56 is a separate piece from the crankshaft 44, as seen in FIGS. 4 and 5. The first axial end 44A of the crankshaft 44 is provided with a plurality of circumferentially spaced blind apertures 84 extending axially into the first axial end 44A of the crankshaft 44, as shown more clearly in FIG. 5. The crankshaft 44 also has a hollow central cylindrical extension 86 extending coaxially away from the first axial end 44A of the crankshaft 44 and it is seen that the blind apertures 84 are arranged radially outwardly from the central cylindrical extension 86. The blind apertures 84 are circumferentially spaced around the first axial end 44A of the crankshaft 44 and are at the same radial position. The blind apertures 84 provide a choice of angular positions in small angular steps and thus the blind apertures 84 are verniered to provide the choice of angular positions in small angular steps. The hollow central cylindrical extension 86 is internally threaded. It is to be noted that the crankshaft 44 is circular in cross-section, but other suitable shapes may be used.

A driving plate 88 has a first circular aperture 90, which has the same diameter as the diameter of the central cylindrical extension 86, a first set of blind apertures 92 extending axially into a first surface of the driving plate 88, a second set of blind apertures (not shown) extending axially into a second opposite surface of the driving plate 88 and a second circular aperture 94, as shown more clearly in FIG. 5. The first and second sets of blind apertures 92 are circumferentially spaced around the first aperture 90 and are at the same radial position and have the same diameter as the blind apertures 84 in the first end 44A of the crankshaft 44. The first set of blind apertures 92 on the first surface of the driving plate 88 are arranged at different angular positions relative to the second set of blind apertures on the second surface of the driving plate 88. The driving plate 88 is reversible to provide a choice of angular positions in small angular steps and thus the first and second sets of blind apertures 92 and the blind apertures 84 in the first axial end 44A of the crankshaft 44 are verniered to provide the choice of angular positions in small angular steps.

A locating pin 96 is provided to select the angular position of the first clevis 76 and the locating pin 96 is located in the desired one of the blind apertures 84 in the first end 44A of the crankshaft 44 and the first aperture 90 of the driving plate 88 is located coaxially on the central cylindrical extension 86 of the crankshaft 44 and the driving plate 88 is rotated such that locating pin 96 is located in the desired one of the blind apertures in the driving plate 88, as seen in FIG. 5.

The crank arm 56 is provided with two longitudinally spaced slots 98 and 100 and an aperture 102, as shown more clearly in FIG. 5. The crank arm 56 is secured to the first end 44A of the crankshaft 44 by a bolt 104 and washer 108 and the bolt 104 is inserted through the slot 98 in the crank arm 56 and passes coaxially though the aperture 90 in the driving plate 88 and is threaded into the central cylindrical extension 86 on the first end 44A of the crankshaft 44. The crank arm 56 is also secured to the driving plate 88 by a bolt 106 and a washer 110 and the bolt 106 is inserted through the slot 100 in the crank arm 56 and is threaded into a nut 112 and a flanged washer 114. The radial position of the crank arm 56 and first clevis 76 is selected by adjusting the position of the bolts 104 and 106 in the slots 98 and 100 of the crank arm 56 before the bolts 104 and 106 are fully tightened.

The crank arm 56 and the first clevis 76 are radially movably, slidably, mounted on the first axial end 44A of the crankshaft 44 by the longitudinally extending and longitudinally spaced slots 98 and 100. The crank arm 56 and the first clevis 76 are movable, slidable, radially with respect to the axis of the crankshaft 44 to a desired radial position before the bolts 104 and 106 are fully tightened to lock the crank arm 56 and the first clevis 76 in the desired radial position. The crank arm 56 and the first clevis 76 may be slid radially to any position between a first radially inner position where a first, outer, end of the slot 98 abuts the bolt 104 and a second radially outer position where a second, inner, end of the slot 98 abuts the bolt 104. The crank arm 56 and the first clevis 76 are set at a first radial position for a first variable stator vane arrangement schedule. However, the crank arm 56 and the first clevis 76 are movable radially inwardly, or radially outwardly, to a second radial position for a second, different, variable stator vane arrangement schedule by untightening the bolt 104 and the nut 112 and the bolt 106, then sliding, moving, the crank arm 56 and the first clevis 76 radially inwardly, or radially outwardly, to the second radial position and then fully tightening the bolt 104 and the nut 112 and the bolt 106 to lock the crank arm 56 and the first clevis 76 in the second radial position. The tightening of the bolt 104 clamps the crank arm 56 and the first clevis 76 against, or onto, the crankshaft 44 and thus, it is seen that the bolt 104 is a releasable lock. The tightening of the bolt 106 clamps the crank arm 56 and the first clevis 76 against, or onto, the driving plate 88. The crank arm 56 and the first clevis 76 are rotatably mounted on the first end 44A of the crankshaft 44.

The aperture 102 is arranged to receive a pin 103 to secure the connecting rod 64 to the first clevis 76 of the crank arm 56. The pin 103 passes through the aperture 102 and through an aperture in the connecting rod 64 and a nut 105 is threaded on the pin 103 to secure the connecting rod 64 to the first clevis 76 on the crank arm 56, as shown in FIG. 3.

The second clevis 78 is provided between the first axial end 44A and the second axial end 44B of the crankshaft 44 and the crank arm 58 is a separate piece from the crankshaft 44, as seen in FIGS. 4 and 5. The crank arm 58 is provided with a radially inner surface 58A and has two wedging surfaces 57 and 59 arranged at the same angle to the radially inner face 58A. The crank arm 58 also has a threaded blind aperture (not shown) in its radially inner face 58A. The crank arm 58 locates in a radial slot 118, which extends transversely across the crankshaft 44, when the crank arm 58 is at its radially inner position and the crank arm 58 is movable radially outwardly and radially inwardly within the radial slot 118. The crankshaft 44 is not circular in cross-section adjacent to the radial slot 118 and is provided with cut outs adjacent to the radial slot 118.

The crankshaft 44 has four threaded studs 120, 122, 124 and 126 provided within the cut outs and the four threaded studs 120, 122, 124 and 126 extend tangentially from the crankshaft 44 at a particular radius from the axis of the crankshaft 44. Two of the threaded studs 120 and 122 extend in one tangential direction, two of the threaded studs 124 and 126 extend in the opposite tangential direction and the threaded studs 120 and 124 are co-linear, coaxial, and the threaded studs 122 and 126 are co-linear, coaxial. The threaded studs 120 and 122 are axially spaced apart and the threaded studs 124 and 126 are axially spaced apart. The threaded studs 120 and 124 are located adjacent to, but spaced from, one axial end of the slot 118 and the threaded studs 122 and 124 are located adjacent to, but spaced from, the opposite axial end of the slot 118.

A first wedge 128 has a radially outer wedging surface 129 and two axially spaced apertures 132 and 134 and a second wedge 130 has a radially outer wedging surface 131 and two axially spaced apertures 136 and 138. The first wedge 128 is mounted on the threaded studs 120 and 122 by arranging the threaded studs 120 and 122 to extend, coaxially, through the apertures 132 and 134 respectively in the first wedge 128 and the second wedge 130 is mounted on the threaded studs 124 and 126 by arranging the threaded studs 124 and 126 to extend, coaxially, through the apertures 136 and 138 respectively in the second wedge 130. The first wedge 128 is secured on the threaded studs 120 and 122 by nuts 140 and 142 respectively and the second wedge 130 is secured on the threaded studs 124 and 126 by nuts 144 and 146 respectively.

The crank arm 58 is secured to the crankshaft 44 by a bolt 148 and washer 150 and the bolt 148 extends through a slot (not shown) extending radially through the crankshaft 44. The slot extends in a direction transverse to the axial direction of the crankshaft 44. The bolt 148 is threaded into the threaded aperture (not shown) in the radially inner surface 58A of the crank arm 58. The wedging surfaces 129 and 131 of the first and second wedges 128 and 130 respectively abut the wedging surfaces 57 and 59 respectively of the crank arm 58. The wedging surfaces 129 and 131 of the first and second wedges 128 and 130 are arranged at the same angle as the wedging surfaces 57 and 59 respectively of the crank arm 58. The wedging surfaces 57 and 59 are arranged to intersect radially inwardly of the radially inner surface 58A of the crank arm 58 and the wedging surfaces 129 and 131 of the first and second wedges 128 and 130 are arranged parallel to the wedging surfaces 57 and 59 of the crank arm 58.

The positions of the crank arm 58 and the second clevis 78 are adjusted by adjusting the positions of the first and second wedges 128 and 130 respectively axially along the threaded studs 120, 122, 124 and 126. The first and second wedges 128 and 130 are moved closer together, by threading the nuts 140, 142, 144 and 146 further onto the threaded studs 120, 122, 124 and 126, to push, or move, the crank arm 58 and the second clevis 78 radially outwards or the first and second wedges 128 and 130 are moved further apart, by unthreading the nuts 140, 142, 144 and 146 further off the threaded studs 120, 122, 124 and 126, to allow the crank arm 58 and second clevis 78 to move radially inwards. The first and second wedges 128 and 130 may be moved the same distances along the threaded studs 120, 122, 124 and 126 such that the crank arm 58 and the second clevis 78 moves with a purely radial component of movement.

Alternatively the first wedge 128 may be moved a different distance along the threaded studs 120 and 122 compared to the distance that the second wedge 130 is moved along the threaded studs 124 and 126 such that the crank arm 58 and the second clevis 78 moves with radial and angular components of movement. The radial slot in the crankshaft 44 allows the angular position of the crank arm 58 and the second clevis 78 to be changed.

The second clevis 78 is movably mounted on the crankshaft 44 such that it is movable radially with respect to the axis of the crankshaft 44 to a desired radial position using the first and second wedges 128 and 130 before the bolt 148 is fully tightened to lock the second clevis 78 in the desired radial position. The second clevis 78 is set at a first radial position for the first variable stator vane arrangement schedule. But, the second clevis 78 is movable radially inwardly, or radially outwardly, to a second radial position for the second variable stator vane arrangement schedule by untightening the bolt 148, then unthreading, or threading, the nuts 140, 142, 144 and 146 on the threaded studs 120, 122, 124 and 126 an appropriate number of turns and then fully tightening the bolt 148 to lock the second clevis 78 in the second radial position. Tightening of the bolt 148 clamps the second clevis 78 against, or onto, the crankshaft 44 and thus, it is seen that the bolt 148 is a releasable lock. The movement of the first and second wedges 128 and 130 provides an increased, or a decreased, wedging action on the second clevis 78. The second clevis 78 is movably mounted on the crankshaft 44 such that it is movable angularly with respect to the axis of the crankshaft 44 to a desired angular position using differential movement of the first and second wedges 128 and 130 before the bolt 148 is fully tightened to lock the second clevis 78 in the desired angular position.

The second clevis 78 has an aperture 151 which is arranged to receive a pin 153 to secure the connecting rod 66 to the second clevis 78 of the crank arm 58. The pin 153 passes through the aperture 102 and through an aperture in the connecting rod 66 and a nut 155 is threaded on the pin 153 to secure the connecting rod 66 to the second clevis 78 on the crank arm 58, see FIG. 3.

The third clevis 80 is provided between the first axial end 44A and the second axial end 44B of the crankshaft 44 and the crank arm 60 is a separate piece from the crankshaft 44, as seen in FIGS. 4 and 5. The third clevis 80 and the crank arm 60 are substantially the same as the second clevis 78 and crank arm 58 and are mounted on the crank shaft 44 in substantially the same way.

The crank arm 60 is provided with a radially inner surface 60A and has two wedging surfaces 61 and 63 arranged at the same angle to the radially inner face 60A. The crank arm 60 also has a threaded blind aperture (not shown) in its radially inner face 60A. The crank arm 60 locates in a radial slot 119, which extends transversely across the crankshaft 44, when the crank arm 60 is at its radially inner position and the crank arm 60 is movable radially outwardly and radially inwardly within the radial slot 119. The crankshaft 44 is not circular in cross-section adjacent to the radial slot 119 and is provided with cut outs adjacent to the radial slot 119.

The crankshaft 44 has four threaded studs 152, 154, 156 and 158 provided within the cut outs and the four threaded studs 152, 154, 156 and 158 extend tangentially from the crankshaft 44 at a particular radius from the axis of the crankshaft 44. Two of the threaded studs 152 and 154 extend in one tangential direction, two of the threaded studs 156 and 158 extend in the opposite tangential direction and the threaded studs 152 and 156 are co-linear, coaxial, and the threaded studs 154 and 158 are co-linear, coaxial. The threaded studs 152 and 154 are axially spaced apart and the threaded studs 156 and 158 are axially spaced apart. The threaded studs 152 and 156 are located adjacent to, but spaced from, one axial end of the slot 119 and the threaded studs 154 and 158 are located adjacent to, but spaced from, the opposite axial end of the slot 119.

A third wedge 160 has a radially outer wedging surface 161 and two axially spaced apertures 164 and 166 and a fourth wedge 162 has a radially outer wedging surface 163 and two axially spaced apertures 168 and 170. The third wedge 160 is mounted on the threaded studs 152 and 154 by arranging the threaded studs 152 and 154 to extend, coaxially, through the apertures 164 and 166 respectively in the third wedge 160 and the fourth wedge 162 is mounted on the threaded studs 156 and 158 by arranging the threaded studs 156 and 158 to extend, coaxially, through the apertures 168 and 170 respectively in the fourth wedge 162. The third wedge 160 is secured on the threaded studs 152 and 154 by nuts 172 and 174 respectively and the fourth wedge 162 is secured on the threaded studs 156 and 158 by nuts 176 and 178 respectively.

The crank arm 60 is secured to the crankshaft 44 by a bolt 180 and washer 182 and the bolt 180 extends through a slot (not shown) extending radially through the crankshaft 44. The slot extends in a direction transverse to the axial direction of the crankshaft 44. The bolt 180 is threaded into the threaded aperture (not shown) in the radially inner surface 60A of the crank arm 60. The wedging surfaces 161 and 163 of the third and fourth wedges 160 and 162 respectively abut the wedging surfaces 61 and 63 respectively of the crank arm 60. The wedging surfaces 161 and 163 of the third and fourth wedges 160 and 162 are arranged at the same angle as the wedging surfaces 61 and 63 respectively of the crank arm 60. The wedging surfaces 61 and 63 are arranged to intersect radially inwardly of the radially inner surface 60A of the crank arm 60 and the wedging surfaces 161 and 163 of the third and fourth wedges 160 and 162 are arranged parallel to the wedging surfaces 61 and 63 of the crank arm 60.

The positions of the crank arm 60 and the third clevis 80 are adjusted by adjusting the positions of the third and fourth wedges 160 and 162 respectively axially along the threaded studs 152, 154, 156 and 158. The third and fourth wedges 160 and 162 are moved closer together, by threading the nuts 172, 174, 176 and 178 further onto the threaded studs 152, 154, 156 and 158, to push, or move, the crank arm 60 and the third clevis 80 radially outwards or the third and fourth wedges 160 and 162 are moved further apart, by unthreading the nuts 172, 174, 176 and 178 further off the threaded studs 152, 154, 156 and 158 to allow the crank arm 60 and third clevis 80 to move radially inwards. The third and fourth wedges 160 and 162 may be moved the same distances along the threaded studs 152, 154, 156 and 158 such that the crank arm 60 and the third clevis 80 moves with a purely radial component of movement. Alternatively the third wedge 160 may be moved a different distance along the threaded studs 152 and 154 compared to the distance that the fourth wedge 162 is moved along the threaded studs 156 and 158 such that the crank arm 60 and the third clevis 80 moves with radial and angular components of movement. The radial slot in the crankshaft 44 allows the angular position of the crank arm 60 and the third clevis 80 to be changed.

The third clevis 80 is movably mounted on the crankshaft 44 such that it is movable radially with respect to the axis of the crankshaft 44 to a desired radial position using the third and fourth wedges 160 and 162 before the bolt 180 is fully tightened to lock the third clevis 80 in the desired radial position. The third clevis 80 is set at a first radial position for the first variable stator vane arrangement schedule. But, the third clevis 80 is movable radially inwardly, or radially outwardly, to a second radial position for the second variable stator vane arrangement schedule by untightening the bolt 180, then unthreading, or threading, the nuts 172, 174, 176 and 178 on the threaded studs 152, 154, 156 and 158 an appropriate number of turns and then fully tightening the bolt 180 to lock the third clevis 80 in the second radial position. Tightening of the bolt 180 clamps the third clevis 80 against, or onto, the crankshaft 44 and thus, it is seen that the bolt 104 is a releasable lock. The movement of the third and fourth wedges 160 and 162 provides an increased, or a decreased, wedging action on the third clevis 80. The third clevis 80 is movably mounted on the crankshaft 44 such that it is movable angularly with respect to the axis of the crankshaft 44 to a desired angular position using differential movement of the third and fourth wedges 160 and 162 before the bolt 180 is fully tightened to lock the third clevis 80 in the desired angular position.

The third clevis 80 has apertures 184 which are arranged to receive a pin 185 to secure the connecting rod 68 to the third clevis 80 of the crank arm 60. The pin 185 passes through the aperture 184 and through an aperture in the connecting rod 68 and a nut 187 is threaded on the pin 185 to secure the connecting rod 68 to the third clevis 80 on the crank arm 60, see FIG. 3.

The difference between the crank arm 58 and the second clevis 78 and the crank arm 60 and the third clevis 80 is that the threaded studs 152, 154, 156 and 158 are arranged at a different radius, in this example at a smaller radius, from the axis of the crankshaft 44 than the threaded studs 120, 122, 124 and 126.

Figure 6:
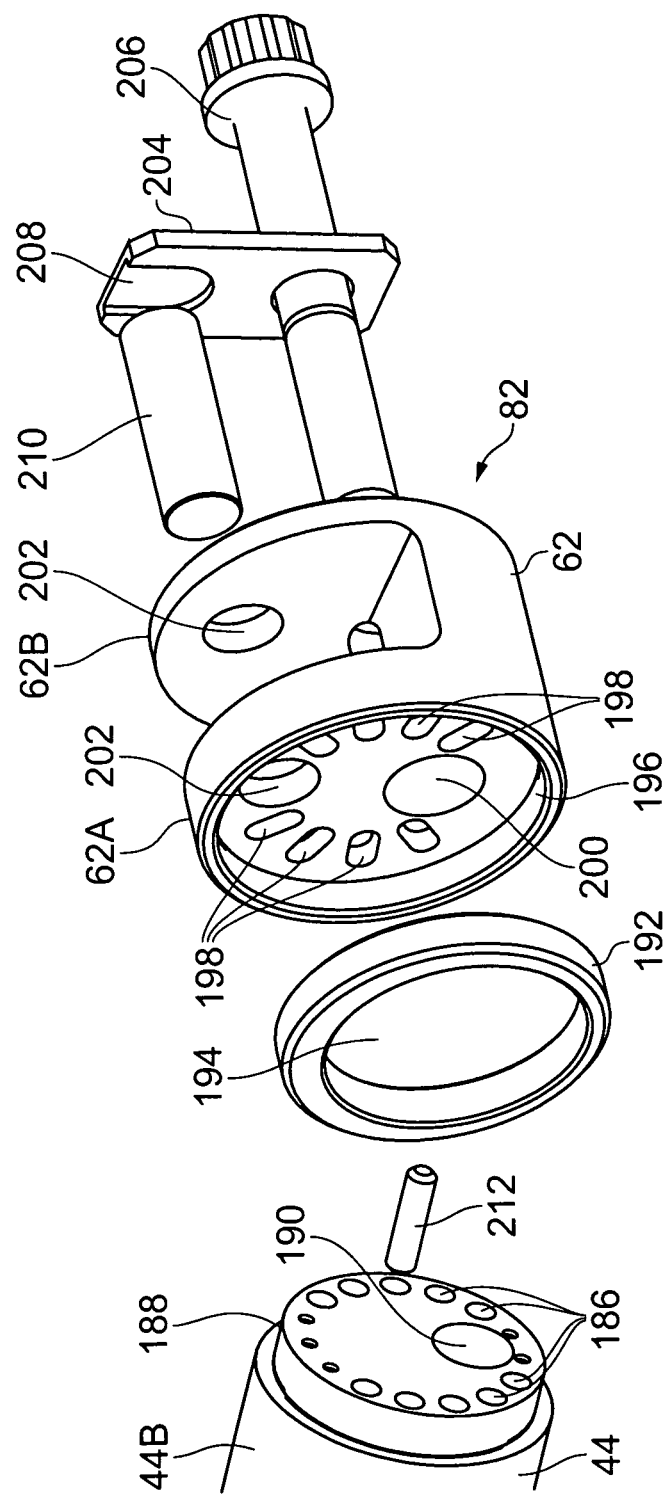
FIG. 6 is an enlarged perspective view of the remote end of the crankshaft of the variable stator vane arrangement shown in FIG. 4.

The fourth clevis 82 is provided at a second axial end 44B of the crankshaft 44 and the crank arm 62 is a separate piece from the crankshaft 44, as seen in FIGS. 4, 5 and 6. The second axial end 44B of the crankshaft 44 is also provided with a plurality of circumferentially spaced blind apertures 186 extending axially into the second axial end 44B of the crankshaft 44, as shown more clearly in FIG. 6. The blind apertures 186 are circumferentially spaced around the second axial end 44B of the crankshaft 44 and are at the same radial position. The second axial end 44B of the crankshaft 44 also has a reduced diameter section 188 and it is seen that the blind apertures 186 are arranged in the reduced diameter section 188. The blind apertures 186 provide a choice of angular positions in small angular steps and thus the blind apertures 186 are verniered to provide a choice of angular positions in small angular steps. The second end 44B of the crankshaft 44 also has a blind aperture 190 positioned such that its axis is arranged eccentrically with respect to the axis of the crankshaft 44. The blind aperture 190 is internally threaded.

A ring 192 has a circular aperture 194, which has the same diameter as the reduced diameter section 188 of the second axial end 44B of the crankshaft 44, and the axis of the circular aperture 194 is arranged eccentrically with respect to the axis of the ring 192.

The crank arm 62 is generally circular in cross-section and has a circular recess 196 at a first axial end 62A of the crank arm 62. The recess 196 has a base and the base of the recess 196 is provided with a plurality of blind slots 198 and the blind slots 198 are circumferentially spaced and extend radially. An aperture 200 extends axially through the crank arm 62 and the fourth clevis 82 and the aperture 200 is arranged eccentrically with respect to the axis of the crank arm 62. Further coaxial apertures 202 are provided in the fourth clevis 82 and the apertures 202 are arranged concentrically with respect to the axis of the crank arm 62 and parallel to the aperture 200. The crank arm 62 is secured to the second end 44B of the crankshaft 44 by a bolt 206 and the bolt 104 is inserted through the aperture 200 in the crank arm 62 and passes through the aperture 194 in the ring 192 and is threaded into the blind aperture 190 in the second axial end 44B of the crankshaft 44. The bolt 206 also passes through an aperture in a plate 204 and the plate 204 abuts the second axial end 62B of the crank arm 62/fourth clevis 82.

A locating pin 212 is provided to select the angular position of the fourth clevis 82 and the locating pin 212 is located in the desired one of the blind apertures 186 in the second end 44B of the crankshaft 44 and the ring 192 is located on the reduced diameter section 188 at the second axial end 44B of the crankshaft 44 and the ring 192 is also located in the recess 196 in the first axial end 62A of the crank arm 62 such that locating pin 212 is located in the desired one of the blind slots 198 in the base of the recess 196 of the crank arm 62, as seen in FIG. 6.

The radial and angular position of the crank arm 62 and fourth clevis 82 is selected by rotating the ring 192. The angular position of the crank arm 62 and fourth clevis 82 is achieved by positioning the locating pin 212 in a desired one of the blind apertures 186 in the second axial end 44B of the crankshaft 44. The blind apertures 186 are verniered, as mentioned previously, to provide a choice of positions in small steps. The crank arm 62, fourth clevis 82 and ring 192 are locked in position with the bolt 206. The diameter of the aperture 200 is larger than the diameter of the bolt 206 to allow for changes in radial position and angular position of the crank arm 62 and fourth clevis 82.

The crank arm 62 and the fourth clevis 82 are movably, eccentrically rotatably, mounted on the second axial end 44B of the crankshaft 44 by the ring 192. The crank arm 62 and the fourth clevis 82 are movable radially with respect to the axis of the crankshaft 44 to a desired radial position by rotating the ring 192 around the reduced diameter section 188 of the second axial end 44B of the crankshaft 44 before the crank arm 62 and the fourth clevis 82 are placed on the ring 194 and the bolt 206 is inserted and fully tightened to lock the crank arm 62 and the fourth clevis 82 in the desired radial position. The crank arm 62 and the fourth clevis 82 are set at a first radial position for the first variable stator vane arrangement schedule. The crank arm 62 and the fourth clevis 82 are movable radially inwardly, or radially outwardly, to a second radial position for a second variable stator vane arrangement schedule by untightening and removing the bolt 206, removing the crank arm 62 and fourth clevis 82 from the ring 192, rotating the ring 192 around the reduced diameter section 188 of the second axial end 44B of the crankshaft 44 to the second position, replacing the crank arm 62 and the fourth clevis 82 on the ring 192 and inserting and fully tightening the bolt 206 to lock the crank arm 62 and the fourth clevis 82 in the second radial position. Tightening of the bolt 206 clamps the crank arm 62 and the fourth clevis 82 against, or onto, the crankshaft 44 and thus, it is seen that the bolt 104 is a releasable lock.

The apertures 202 are arranged to receive a pin 210 to secure the connecting rod 70 to the fourth clevis 82 of the crank arm 62. The pin 210 passes through the apertures 202 and through an aperture in the connecting rod 70 and an end of the pin 210 locates in a slot 208 in a surface of the plate 204, see FIGS. 3 and 6.

Each of the clevises 76, 78, 80 and 82 is set at a corresponding first radial position and a corresponding first angular position for the first variable stator vane arrangement schedule. One or more of the clevises 76, 78, 80 and 82 is moved to a corresponding second radial position and/or a corresponding second radial position for the second variable stator vane arrangement schedule.

In another embodiment of the present disclosure it may be possible to provide the wedging surfaces of the wedges arranged at the same angle as the wedging surfaces of the crank arm. However, the wedging surfaces may be arranged to intersect radially outwardly of the radially inner surface of the crank arm and the wedging surfaces of the wedges are arranged parallel to the wedging surfaces of the crank arm. In this arrangement the wedges are moved further apart to push, move, the crank arm and clevis radially outwards or the wedges are moved closer together to allow the crank arm and clevis to move radially inwards. In this embodiment the wedges may have threaded studs which extend tangentially and pass through respective apertures in lugs on the crankshaft and nuts are provided on the threaded studs to adjust the position of the wedges.

The crank arms with wedging surfaces may have any suitable length to provide the required change in radial and angular position of the clevis in combination with the movement of the crank arm due to adjustment in positions due to movement of the wedges.

In any or all of the embodiments with wedges, the wedges are movable in a plane which is perpendicular to the axis of the crankshaft and in a direction perpendicular to a radial direction.

In any or all of the embodiments with wedges the clevis may be secured to the crankshaft with two bolts extending radially and each wedge may have a single aperture central arranged on a single threaded stud on the crankshaft or each wedge may have a single central threaded stud passing through a single aperture on the crankshaft.

In another embodiment of the present disclosure it may be possible to provide a driving plate in which the apertures which are circumferentially spaced around the first aperture in the driving plate and are at the same radial position and have the same diameter as the blind apertures in the first end of the crankshaft extend from the first surface of the driving plate to the second surface of the driving plate. The blind apertures in the axial end of the crankshaft may be internally threaded. A fastener, e.g. a bolt or a screw may be inserted through a selected one of the apertures in the driving plate and into a selected one of the blind apertures in the axial end of the crankshaft to select the angular position of the crank arm and clevis and lock the crank arm and clevis at that particular angular position. The crank arm, the clevis and the driving plate are rotatably mounted on the hollow central cylindrical extension and removing the fastener from the blind aperture in the axial end of the crankshaft and the aperture in the driving plate allows the crank arm, the clevis and the driving plate to rotate.

There may be a plurality of stages of stator vanes, the stator vanes in each stage of stator vanes being connected to a respective one of the control rings and the crankshaft being drivingly connected to each one of the control rings.

The advantage of the present disclosure is that it provides the ability to optimise the variable stator vane arrangement scheduling during an engine development programme. In particular it provides the ability to optimise the variable stator vane arrangement scheduling during an engine development programme within a shorter time period, saving development costs. In addition it provides the ability to optimise the variable stator vane arrangement scheduling during an engine development programme more precisely, ultimately leading to reduced fuel consumption of the gas turbine engine and improved gas turbine engine operability and integrity. A further advantage of the present disclosure is that it is not necessary to manufacture a number of different crankshafts, each one of which has a plurality of clevises on the crankshaft and each clevis on each crankshaft is provided in a fixed position on the crankshaft and thus the operating schedule for all the stages of variable stator vanes is fixed for each crankshaft, e.g. each crank arm is provided at a fixed circumferential position on the crankshaft and each crank arm has a fixed length for each crankshaft. Another advantage of the present disclosure is that it provides a crankshaft in which one or more of the clevises are adjustably mounted on the crankshaft so that the radial position and/or the angular position of the clevis may be changed quickly and precisely.

Although the present disclosure has been described with reference to a variable stator vane arrangement for a compressor it is equally applicable to a variable stator vane arrangement for a turbine.

Although the present disclosure has been described with reference to a variable stator vane arrangement for a gas turbine engine it is equally applicable to a variable stator vane arrangement for other turbomachines. The present disclosure is applicable to an aero gas turbine engine, a marine gas turbine engine, an automotive gas turbine engine or an industrial gas turbine engine. The present disclosure is applicable to a turbofan gas turbine engine, a turbo-shaft gas turbine engine, a turbo-propeller gas turbine engine or a turbojet gas turbine engine.

Drawing References

| Ref. No. | Description |
|---|---|
| 10 | Turbofan gas turbine engine |
| 11 | Intake |
| 12 | Fan |
| 13 | Intermediate Pressure Compressor |
| 14 | High Pressure Compressor |
| 15 | Combustion Chamber |
| 16 | High Pressure Turbine |
| 17 | Intermediate Pressure Turbine |
| 18 | Low Pressure Turbine |
| 19 | Exhaust |
| 26 | First Shaft |
| 28 | Second Shaft |
| 30 | Third Shaft |
| 32 | Rotor |
| 34 | Rotor Blades |
| 35 | Variable Stator Vane Arrangement |
| 36 | Stator Casing |
| 38 | Stator Vanes |
| 39 | Spindle |
| 40 | Lever |
| 41 | Aperture |
| 42 | Control Ring |
| 43 | Bosses |
| 44 | Crankshaft |
| 48 | Mounting Bracket |
| 50 | Mounting Bracket |
| 52 | Bearing |
| 54 | Bearing |
| 56 | Crank Arm |
| 57 | Wedging Surface |
| 58 | Crank Arm |
| 59 | Wedging Surface |
| 60 | Crank Arm |
| 61 | Wedging Surface |
| 62 | Crank Arm |
| 63 | Wedging Surface |
| 64 | Connecting Rod |
| 66 | Connecting Rod |
| 68 | Connecting Rod |
| 70 | Connecting Rod |
| 72 | Crank Arm |
| 74 | Connecting Rod |
| 76 | First Clevis |
| 78 | Second Clevis |
| 80 | Third Clevis |
| 82 | Fourth Clevis |
| 84 | Blind Apertures |
| 86 | Central Cylindrical Extension |
| 88 | Driving Plate |
| 90 | Aperture |
| 92 | Blind Apertures |
| 94 | Aperture |
| 96 | Locating Pin |
| 98 | Slot |
| 100 | Slot |
| 102 | Aperture |
| 103 | Pin |
| 104 | Bolt |
| 105 | Nut |
| 106 | Bolt |
| 108 | Washer |
| 110 | Washer |
| 112 | Nut |
| 114 | Washer |
| 118 | Radial Slot |
| 119 | Radial Slot |
| 120 | Threaded Stud |
| 122 | Threaded Stud |
| 124 | Threaded Stud |
| 126 | Threaded Stud |
| 128 | Wedge |
| 129 | Wedging Surface |
| 130 | Wedge |
| 131 | Wedging Surface |
| 132 | Aperture |
| 134 | Aperture |
| 136 | Aperture |
| 138 | Aperture |
| 140 | Nut |
| 142 | Nut |
| 144 | Nut |
| 146 | Nut |
| 148 | Bolt |
| 150 | Washer |
| 151 | Aperture |
| 152 | Threaded Stud |
| 153 | Pin |
| 154 | Threaded Stud |
| 155 | Nut |
| 156 | Threaded Stud |
| 158 | Threaded Stud |
| 160 | Wedge |
| 161 | Wedging Surface |
| 162 | Wedge |
| 163 | Wedging Surface |
| 164 | Aperture |
| 166 | Aperture |
| 168 | Aperture |
| 170 | Aperture |
| 172 | Nut |
| 174 | Nut |
| 176 | Nut |
| 178 | Nut |
| 180 | Bolt |
| 182 | Washer |
| 184 | Apertures |
| 185 | Pin |
| 186 | Blind Apertures |
| 187 | Nut |
| 188 | Reduced Diameter Section |
| 190 | Blind Aperture |
| 192 | Ring |
| 194 | Aperture |
| 196 | Recess |
| 198 | Blind Slots |
| 200 | Aperture |
| 202 | Apertures |
| 204 | Plate |
| 206 | Bolt |
| 208 | Slot |
| 210 | Pin |
| 212 | Pin |

The invention claimed is:

1. A variable stator vane arrangement comprising a casing, a plurality of stages of variable stator vanes, a plurality of connecting rods and a crankshaft, each stage of variable stator vanes comprises a plurality of stator vanes, a control ring and a plurality of operating levers, each operating lever connects the control ring to a respective one of the stator vanes, the stator vanes in each stage of variable stator vanes are circumferentially spaced apart in the casing, the stator vanes in each stage of variable stator vanes are rotatably mounted in the casing, the crankshaft is rotatably mounted on the casing, the crankshaft has an axis and a plurality of clevises, each connecting rod connects one of the plurality of clevises on the crankshaft to a respective one of the control rings, wherein at least one clevis of the plurality of clevises is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position, and wherein the releasable lock is able to lock the at least one clevis in each one of a plurality of radial positions and/or angular positions.

2. The variable stator vane arrangement as claimed in claim 1, wherein the at least one clevis is radially slidably mounted on the crankshaft, rotatably mounted on the crankshaft or eccentrically rotatably mounted on the crankshaft.

3. The variable stator vane arrangement as claimed in claim 1 wherein the plurality of clevises are adjustably mounted on the crankshaft.

4. The variable stator vane arrangement as claimed in claim 1, wherein the variable stator vane arrangement is selected from the group consisting of a compressor variable stator arrangement and a turbine variable stator vane arrangement.

5. The variable stator vane arrangement as claimed in claim 1,
wherein the variable stator vane arrangement is selected from the group consisting of a variable stator vane arrangement for a gas turbine engine and a variable stator vane arrangement for a turbomachine.

6. A variable stator vane arrangement comprising a casing, a plurality of stages of variable stator vanes, a plurality of connecting rods and a crankshaft,
each stage of variable stator vanes comprises a plurality of stator vanes, a control ring and a plurality of operating levers, each operating lever connects the control ring to a respective one of the stator vanes,
the stator vanes in each stage of variable stator vanes are circumferentially spaced apart in the casing, the stator vanes in each stage of variable stator vanes are rotatably mounted in the casing,
the crankshaft is rotatably mounted on the casing, the crankshaft has an axis and a plurality of clevises,
each connecting rod connects one of the plurality of clevises on the crankshaft to a respective one of the control rings,
wherein at least one clevis of the plurality of clevises is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position, and
wherein the adjusting mechanism comprises two wedges and the wedges are movable in a plane which is perpendicular to the axis of the crankshaft and in a direction perpendicular to a radial direction.

7. The variable stator vane arrangement as claimed in claim 6, wherein the at least one clevis is secured to the crankshaft by a fastener, the fastener extends through an aperture in the crankshaft, the aperture is arranged radially with respect to the axis of the crankshaft, the clevis has two angled wedging surfaces and both of the wedges has a wedging surface arranged to abut a corresponding wedging surface on the clevis.

8. The variable stator vane arrangement as claimed in claim 7, wherein the fastener comprises a bolt and the clevis has a threaded aperture to receive the bolt.

9. The variable stator vane arrangement as claimed in claim wherein the aperture is a slot extending transversely of the crankshaft.

10. The variable stator vane arrangement as claimed in claim 6, wherein each wedge is arranged on at least one threaded stud extending from the crankshaft.

11. The variable stator vane arrangement as claimed in claim 10, wherein each wedge is arranged on two threaded studs extending from the crankshaft.

12. The variable stator vane arrangement as claimed in claim 6, wherein the wedging surfaces of the clevis are arranged to intersect radially inwardly of a radially inner surface of the clevis and the wedging surfaces of the wedges are arranged parallel to the wedging surfaces of the clevis.

13. The variable stator vane arrangement as claimed in claim 6, wherein the plurality of clevises are adjustably mounted on the crankshaft.

14. The variable stator vane arrangement as claimed in claim 6, wherein the variable stator vane arrangement is selected from the group consisting of a compressor variable stator arrangement and a turbine variable stator vane arrangement.

15. A variable stator vane arrangement comprising a casing, a plurality of stages of variable stator vanes, a plurality of connecting rods and a crankshaft,
each stage of variable stator vanes comprises a plurality of stator vanes, a control ring and a plurality of operating levers, each operating lever connects the control ring to a respective one of the stator vanes,
the stator vanes in each stage of variable stator vanes are circumferentially spaced apart in the casing, the stator vanes in each stage of variable stator vanes are rotatably mounted in the casing,
the crankshaft is rotatably mounted on the casing, the crankshaft has an axis and a plurality of clevises,
each connecting rod connects one of the plurality of clevises on the crankshaft to a respective one of the control rings,
wherein at least one clevis of the plurality of clevises is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position,
wherein the at least one clevis is radially slidably mounted on the crankshaft, rotatably mounted on the crankshaft or eccentrically rotatably mounted on the crankshaft, and
wherein the adjusting mechanism comprises a plurality of circumferentially spaced apertures in an end of the crankshaft, a locating pin is arranged in a selected one of the apertures in the end of the crankshaft, a driving plate is rotatably mounted on the crankshaft about the axis of the crankshaft, the driving plate has a plurality of circumferentially spaced apertures in at least one surface of the plate, the locating pin is arranged in a selected one of the apertures in the driving plate, a crank arm has first and second radially aligned slots and the clevis, the crank arm is secured to the end of the crankshaft by a first fastener positioned in the first slot and the crank arm is secured to the driving plate by a second fastener positioned in the second slot.

16. The variable stator vane arrangement as claimed in claim 10, wherein the variable stator vane arrangement is selected from the group consisting of a compressor variable stator arrangement and a turbine variable stator vane arrangement.

17. A variable stator vane arrangement comprising a casing, a plurality of stages of variable stator vanes, a plurality of connecting rods and a crankshaft,
   each stage of variable stator vanes comprises a plurality of stator vanes, a control ring and a plurality of operating levers, each operating lever connects the control ring to a respective one of the stator vanes,
   the stator vanes in each stage of variable stator vanes are circumferentially spaced apart in the casing, the stator vanes in each stage of variable stator vanes are rotatably mounted in the casing,
   the crankshaft is rotatably mounted on the casing, the crankshaft has an axis and a plurality of clevises,
   each connecting rod connects one of the plurality of clevises on the crankshaft to a respective one of the control rings,
   wherein at least one clevis of the plurality of clevises is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position,
   wherein the at least one clevis is radially slidably mounted on the crankshaft, rotatably mounted on the crankshaft or eccentrically rotatably mounted on the crankshaft, and
   wherein the adjusting mechanism comprises a plurality of circumferentially spaced apertures in an end of the crankshaft, a locating pin is arranged in a selected one of the apertures in the end of the crankshaft, a ring has an eccentric aperture, the ring is rotatably mounted on the end of the crankshaft, the ring is located in a recess in the clevis, the base of the recess has a plurality of circumferentially spaced slots, the slots extend radially, the locating pin is arranged in a selected one of the slots in the base of the recess, the clevis is secured to the end of the crankshaft by a fastener.

18. The variable stator vane arrangement as claimed in claim 17, wherein the variable stator vane arrangement is selected from the group consisting of a compressor variable stator arrangement and a turbine variable stator vane arrangement.

19. A variable stator vane arrangement crankshaft, the crankshaft having an axis and a plurality of clevises,
   wherein at least one clevis is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position, the releasable lock being able to lock the at least one clevis in each one of a plurality of radial positions and/or angular positions.

20. A method of operating a variable stator vane arrangement, the variable stator vane arrangement comprising a casing, a plurality of stages of variable stator vanes, a plurality of connecting rods and a crankshaft,
   each stage of variable stator vanes comprises a plurality of stator vanes, a control ring and a plurality of operating levers, each operating lever connects the control ring to a respective one of the stator vanes,
   the stator vanes in each stage of variable stator vanes are circumferentially spaced apart in the casing, the stator vanes in each stage of variable stator vanes are rotatably mounted in the casing,
   the crankshaft is rotatably mounted on the casing, the crankshaft has an axis and a plurality of clevises,
   each connecting rod connects one of the clevises on the crankshaft to a respective one of the control rings,
   wherein at least one clevis is movably mounted on the crankshaft such that it is movable radially relative to the axis of the crankshaft and/or such that it is movable angularly relative to the axis of the crankshaft, the at least one clevis is adjustably secured to the crankshaft by an adjusting mechanism, the adjusting mechanism is arranged to select the radial position of the at least one clevis relative to the axis of the crankshaft and/or the angular position of the at least one clevis relative to the axis of the crankshaft, the adjusting mechanism including a releasable lock to lock the at least one clevis in a selected radial position and/or a selected angular position,
   the method comprising positioning the at least one clevis at a first radial position relative to an axis of the crankshaft and a first angular position relative to an axis of the crankshaft for a first variable stator vane arrangement schedule and positioning the at least one clevis at a second radial position relative to an axis of the crankshaft and/or a second angular position relative to an axis of the crankshaft for a second variable stator vane arrangement schedule.

* * * * *